Sept. 18, 1923.
C. DOZIER
1,468,614
SHOCK ABSORBER
Filed Dec. 1, 1922
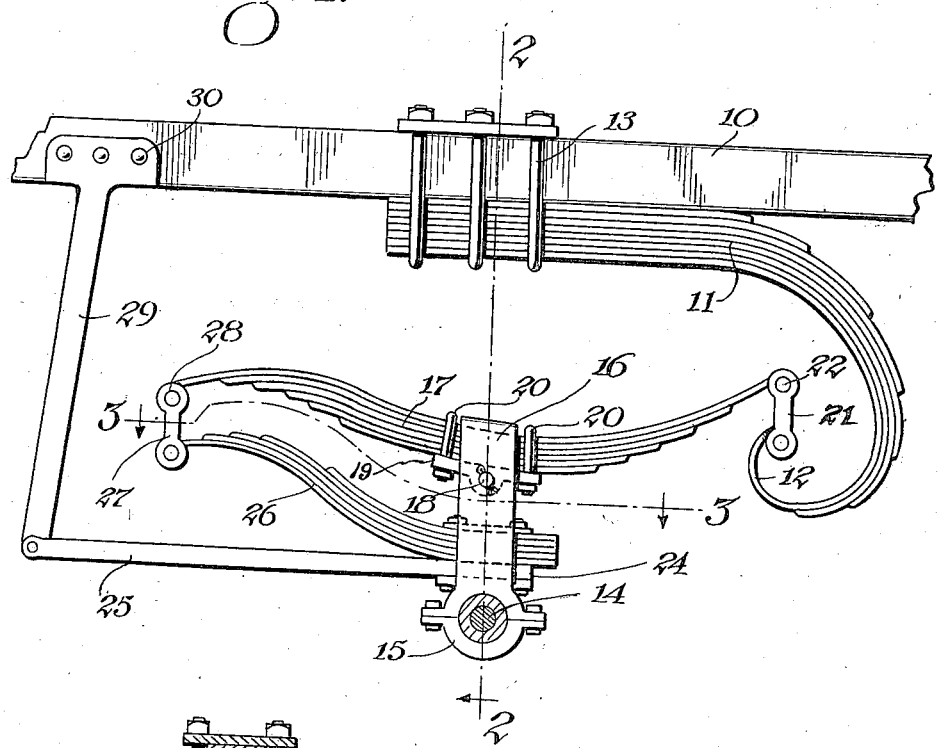
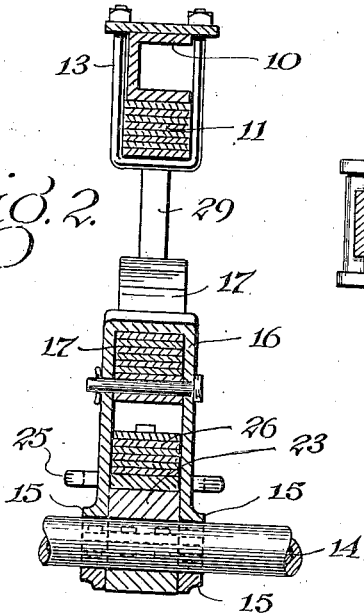
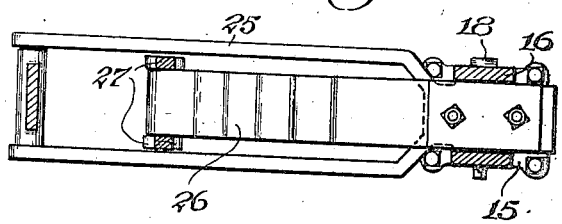
Inventor
CALVIN DOZIER.
by J. F. Newton
Attorney Patented Sept. 18, 1923.

1,468,614

UNITED STATES PATENT OFFICE.

CALVIN DOZIER, OF RICHMOND, KENTUCKY.

SHOCK ABSORBER.

Application filed December 1, 1922. Serial No. 604,360.

*To all whom it may concern:*

Be it known that I, CALVIN DOZIER, a citizen of the United States, residing at Richmond, in the county of Madison and State of Kentucky, have invented certain new and useful Improvements in Shock Absorbers, of which the following is a specification.

This invention relates to vehicles, and has special reference to a spring suspension for vehicles.

More particularly the invention relates to a novel spring arrangement constituting a shock absorber.

One important object of the invention is to provide an improved general arrangement of springs for supporting a vehicle on its axle.

A second important object of the invention is to provide an improved spring arrangement of this character wherein both the main and the shock absorbing springs will be cantilever springs.

A third important object of the invention is to provide a novel spring arrangement wherein the axle has the central portion of a leaf spring connected thereto, the ends of said leaf spring being spring connected respectively to the frame and axle of the vehicle.

With the above and other objects in view as will be hereinafter apparent, the invention consists in general of certain novel details of construction and combinations of parts hereafter fully described, illustrated in the accompanying drawings and specifically claimed.

In the accompanying drawings like characters of reference indicate like parts in the several views, and:—

Fig. 1 is a side elevation showing a portion of the frame and one axle of a vehicle provided with this spring arrangement.

Fig. 2 is a section on the line 2—2 of Fig. 1.

Fig. 3 is a section on the line 3—3 of Fig. 1.

In the embodiment of the invention herein illustrated, there is disclosed a portion of a vehicle frame member 10, and to this frame member is secured the butt or large end of a cantilever spring 11 having a spirally curved end 12, the spring consisting as usual of a plurality of leaves graduated in length so as to produce a tapering of the spring as a whole from butt to the spiral end. This butt end is secured by the usual spring clips 13.

At 14 is a vehicle axle, and this axle extends through the eye ends 15 of an inverted U-shaped hanger 16, which extends upwardly from the axle. Through the upper end of this hanger extends a reversely curved leaf spring 17 which is secured by a bolt 18 passing through the central part of a saddle 19 whereto the spring 17 is secured by clip bolts 20. This reversely curved spring is preferably termed a "see-saw" spring owing to its being secured in the middle and having one end curved up and the other curved down. The upwardly curved end of this spring is connected to the end 12 of the spring 11 by shackles 21 through which pass the shackle bolts 22.

Between the eyes 15 is located a saddle 23 which is carried on the axle 14 and secured on this saddle is the flat end 24 of a fork 25. On this flat end 24 is fixed the butt or large end of a cantilever spring 26 formed of a plurality of leaves and extending in substantial parallelism with the downwardly curved half of the spring 17, the extremities of this downwardly curved half and the spring 26 being connected by the shackles 27 and bolts 28. The forward end of the fork 25 is pivoted for vertical swinging movement to the lower end of a bracket 29 which is fixed to the frame member 10 by rivets 30.

The action of these springs is as follows: A blow on the vehicle wheel such as to move the axle upwardly lifts the free end of the fork 25 and the yoke 16. This tends to cause tilting of the spring 17 which is yieldably resisted by the spring 26, thus causing yielding of the springs 17 and 11, the various springs reassuming their original positions after the passing of the stresses inducing the distortion of the parts.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination with a vehicle frame member and an axle; of a cantilever spring having its larger end connected to the frame member, a second cantilever spring having its larger end connected with the axle, and a tilting member supported intermediate its ends from said axle and having its respective ends connected to the free ends of the respective springs.

2. The combination with a vehicle frame member and an axle; of a cantilever spring having its larger end connected to the frame member, a second cantilever spring having its larger end connected with the axle, and a tilting spring member supported intermediate its ends from said axle and having its respective ends connected to the free ends of the respective springs.

3. The combination with a vehicle frame member and an axle; of a cantilever spring having its larger end connected to the frame member, a second cantilever spring having its larger end connected with the axle, and a tilting reversely curved spring member supported intermediate its ends from said axle and having its respective ends connected to the free ends of the respective springs.

4. The combination with a vehicle frame member and an axle; of a cantilever spring having its larger end connected to the frame member, a second cantilever spring having its larger end connected with the axle, a bracket fixed to the frame member and depending therefrom, a fork having one end pivoted to the lower part of the bracket and having its free end secured to the larger end of the second spring, and a tilting member supported intermediate its ends from said axle and having its respective ends connected to the free ends of the respective springs.

5. The combination with a vehicle frame member and an axle; of a cantilever spring having its larger end connected to the frame member, a second cantilever spring having its larger end connected with the axle, a bracket fixed to the frame member and depending therefrom, a fork having one end pivoted to the lower part of the bracket and having its free end secured to the larger end of the second spring, and a tilting spring member supported intermediate its ends from said axle and having its respective ends connected to the free ends of the respective springs.

6. The combination with a vehicle frame member and an axle; of a cantilever spring having its larger end connected to the frame member, a second cantilever spring having its larger end connected with the axle, a bracket fixed to the frame member and depending therefrom, a fork having one end pivoted to the lower part of the bracket and having its free end secured to the larger end of the second spring, and a tilting reversely curved spring member supported intermediate its ends from said axle and having its respective ends connected to the free ends of the respective springs.

7. The combination with a vehicle frame member and an axle; of a cantilever spring having its larger end connected to the frame member and its free end spirally curved, a saddle carried by said axle, a bracket depending from the frame member, a fork pivoted to the lower end of the bracket and having its free end secured on said saddle, a second cantilever spring having its large end secured to the free end of said fork, an inverted U-shaped yoke having its ends mounted on said axle, a bolt passing through the arms of said yoke adjacent its upper end, a second saddle pivoted on said bolt, a reversely curved leaf spring having its central portion secured to the second saddle, and spring shackles securing the free ends of the second spring to the free ends of the respective cantilever springs.

In testimony whereof I hereunto affix my signature.

CALVIN DOZIER.